United States Patent [19]

Cole

[11] 4,201,532

[45] May 6, 1980

[54] EXTRUSION DIES OF SPIRAL MANDREL TYPE

[76] Inventor: Robert J. Cole, 224 St. George St., Toronto, Ontario, Canada M5R 2N9

[21] Appl. No.: 930,209

[22] Filed: Aug. 2, 1978

[51] Int. Cl.² .............................................. B29D 23/04
[52] U.S. Cl. ................... 425/380; 425/326.1; 425/467
[58] Field of Search ............ 425/380, 381, 467, 326.1; 264/173, 95

[56] References Cited

U.S. PATENT DOCUMENTS

| | | | |
|---|---|---|---|
| 3,418,687 | 12/1968 | Albert | 425/380 |
| 3,452,125 | 6/1969 | Schurman et al. | 425/381 |
| 3,689,192 | 9/1972 | Upmeier | 425/467 |
| 3,809,515 | 5/1974 | Farrell | 425/467 |
| 3,966,861 | 6/1976 | Papesh et al. | 264/173 |

FOREIGN PATENT DOCUMENTS

| | | | |
|---|---|---|---|
| 1964675 | 7/1971 | Fed. Rep. of Germany | 425/467 |
| 46-35988 | 10/1971 | Japan | 425/376 B |

OTHER PUBLICATIONS

Flow Analysis In Extrusion Dies–*SPE Journal*–Feb., 1972–vol. 28, pp. 34–41.

*Primary Examiner*—Jeffery R. Thurlow
*Attorney, Agent, or Firm*—Hirons, Rogers & Scott

[57] ABSTRACT

In an extrusion die of the spiral mandrel type the cross holes and their respective helical channels or grooves are arranged in sets, each set including at least two cross-holes disposed one above the other in the direction of the mandrel longitudinal axis. Preferably each set includes three or four cross holes disposed one above the other. This structure permits the provision of a large number of cross holes while leaving large spaces between the sets through which other passages, such as for bubble internal cooling system pipes, can be passed. All of the channels or grooves are relieved into the melt flow passage in the die at the same plane perpendicular to the mandrel axis. Unexpectedly the structure permits desired uniformity of annular flow from the die orifice to be obtained.

6 Claims, 5 Drawing Figures

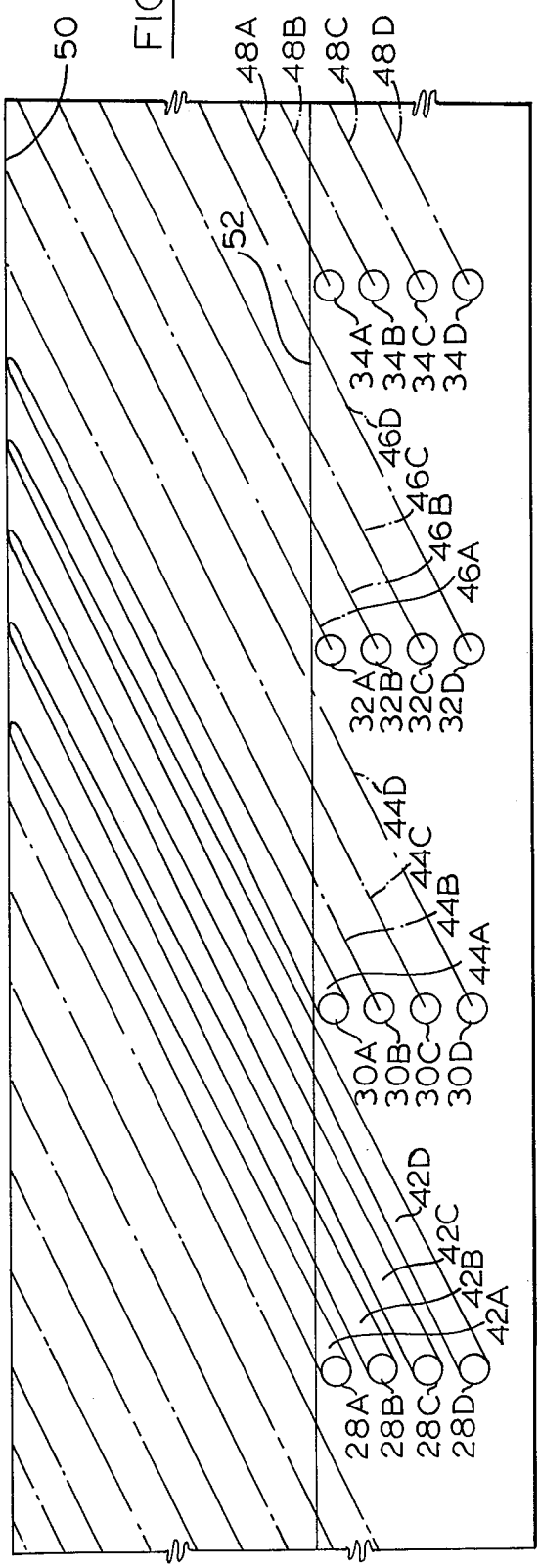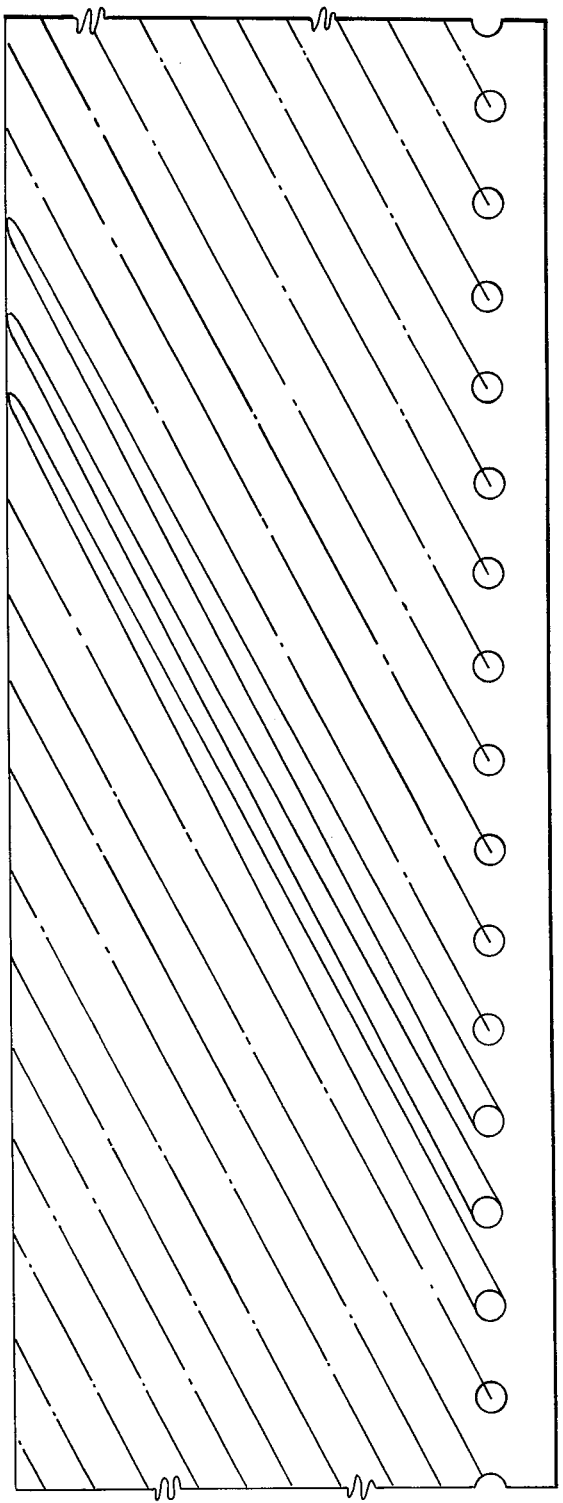

EXTRUSION DIES OF SPIRAL MANDREL TYPE

FIELD OF THE INVENTION

The present invention is concerned with improvements in or relating to dies of the spiral mandrel type for the extrusion of molten plastic material in the form of a tube.

REVIEW OF THE PRIOR ART

Extrusion dies for the production of a tube of plastic material usually consists of a central mandrel surrounded by a cylindrical die body to form an annular flow passage through which the molten plastic material passes to emerge from an annular die orifice. The molten material enters the die from the extruder supplying it via a single cylindrical passage and it is a constant endeavour to convey the molten material to the annular die orifice for it to flow therefrom as evenly as possible uniformly around the entire orifice circumference, so that the resultant film is of uniform thickness. To this end the said single passage discharges at a common central entry point within the mandrel to a plurality of radially outwardly-extending cross-holes distributed uniformly around the mandrel. The cross-holes discharge to the exterior of the mandrel in the same plane, and each leads into the beginning of a respective helical grooved channel recessed in the cylindrical outer mandrel wall and extending in the flow direction, the resulting plurality of helical grooved channels being made as similar as possible. The channels are of decreasing cross section area in the flow direction, while at the same time the annular flow passage is of increasing cross-section area in the same direction, the object being that the plurality of individual tubularic streams from the cross-holes will pass partly along the helical passage and partly along the annular passage, and will thereby merge together into a uniform annular stream by the time the die orifice is reached.

It is apparent therefore that obtaining a uniform annular stream is facilitated by increasing the number of cross holes and helices, and an increase in number can also assist in lowering the pressure drop through the die, which is highly desirable, but in practice an upper limit for the number possible is reached very quickly, in that too many cross-holes will result in a structurally weak construction. The situation has been made more difficult by the development of internal coolers for the bubble, which require the provision of one or several pairs of cooler pipes passing through the mandrel interior to circulate cooling gases between the internal cooler and an external unit. It then becomes extremely difficult to arrange for the provision of both the cooler pipes and a desired number of cross-holes, and the decision must usually be in favour of reducing the number of cross-holes or increasing the size of each of the restricted number of such holes.

DEFINITION OF THE INVENTION

It is therefore an object of the invention to provide a new extrusion die of the spiral mandrel type in which an increased number of cross-holes can be provided as compared with a die of the same size known hitherto.

In accordance with the present invention there is provided an extrusion die of the spiral mandrel type comprising:

a central mandrel having a cylindrical outer surface, disposed about a longitudinal axis;

the mandrel having an inlet thereto and a plurality of outlets therefrom to the said outer surface, each outlet being connected to the inlet by a respective radially-extending cross-hole; and a cylindrical die body surroundng the mandrel whereby there is formed betweem them an annular flow passage into which the said outlets discharge and which terminates in an annular die outlet orifice;

the said annular flow passage including a plurality of helical channels extending in the direction of flow of material in the annular passage, each helical channel being of progressively decreasing cross-section area in the said direction of flow, each outlet from the mandrel feeding into a respective helical channel and thence into the annular flow passage, so that all of the said outlets feed into the one said annular flow passage;

wherein the said cross holes and the respective outlets therefor feeding into the one said annular flow passage are disposed in a plurality of sets, each set consisting of at least two cross holes and two respective outlets, the two cross holes and respective outlets of each set being disposed one above the other axially with respect to the said longitudinal axis.

DESCRIPTION OF THE DRAWINGS

A spiral mandrel die which is a particular preferred embodiment of the invention will now be described, by way of example, with reference to the accompanying diagrammatic drawings, wherein:

FIG. 4 is a schematic developed illustration of the layout of the helical channels of the mandrel of FIGS. 1 to 3, and FIG. 5 is a similar illustration to FIG. 4 of a prior art spiral mandrel die.

DESCRIPTION OF THE PREFERRED EMBODIMENT

Figure 1:
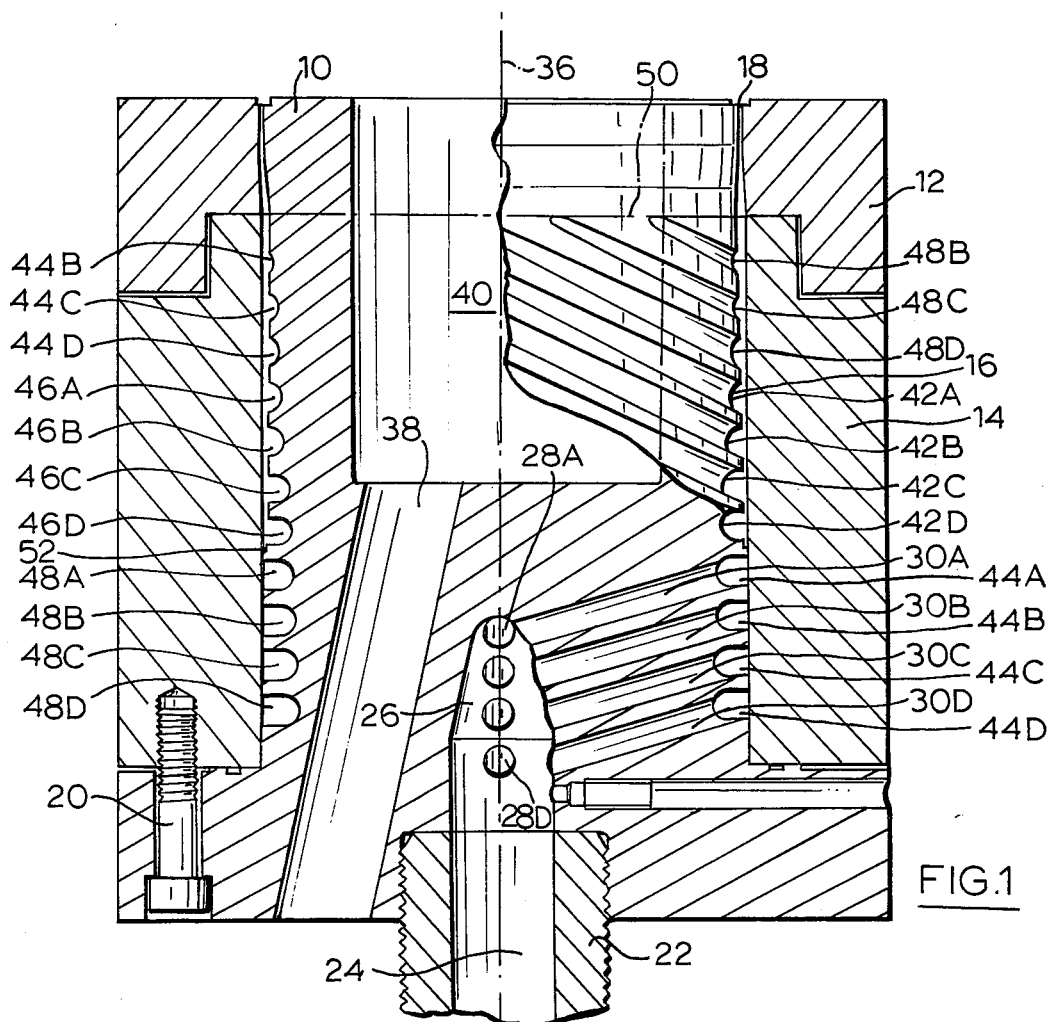
FIG. 1 is a longitudinal cross-section through a spiral mandrel die of the invention, taken on the line 1—1 of FIG. 2, the sections to the left and right of the longitudinal centre-line being taken at 135° to one another, so that the right-hand section passes through the cross-holes, while the left-hand section passes through holes required for the bubble internal cooling system.

The die of the invention consists of a central mandrel 10 having a cylindrical outer surface, and a cylindrical die body, formed of two parts 12 and 14 bolted together, the body surrounding the mandrel so as to form between them an annular flow passage 16 terminating at the upper die face in an annular die outlet orifice 18. The mandrel and body are fastened together by bolts 20 and the die is mounted on a boss 22 through which the molten plastic material (melt) is fed to the die interior via a passage 24.

The part of the mandrel into which the boss 22 extends is provided with a plenum chamber 26 into which the passage 24 discharges. The interior of chamber 26 is connected to the mandrel outer surface by sixteen cross-holes arranged in four sets of four, the sets having the respective reference 28, 30, 32 and 34, while the four cross-holes of each set have the respective subscript reference A, B, C and D. Immediately adjacent sets are disposed at 90° to one another and extend radially outwards with respect to the die longitudinal axis 36; only two of the sets 28 and 30 can be indicated in FIG. 1 and the third and fourth sets 32 and 34 are disposed diametrically opposite to the sets 28 and 30 respectively. It will be seen that the circular inlet and outlet openings of the cross-holes are disposed directly one above the other in the direction parallel to the die and mandrel longitudinal axis 36, the centres of the inlet openings lying in one plane containing the axis 36, while the centres of the outlet openings lie in another such plane.

Figure 2:
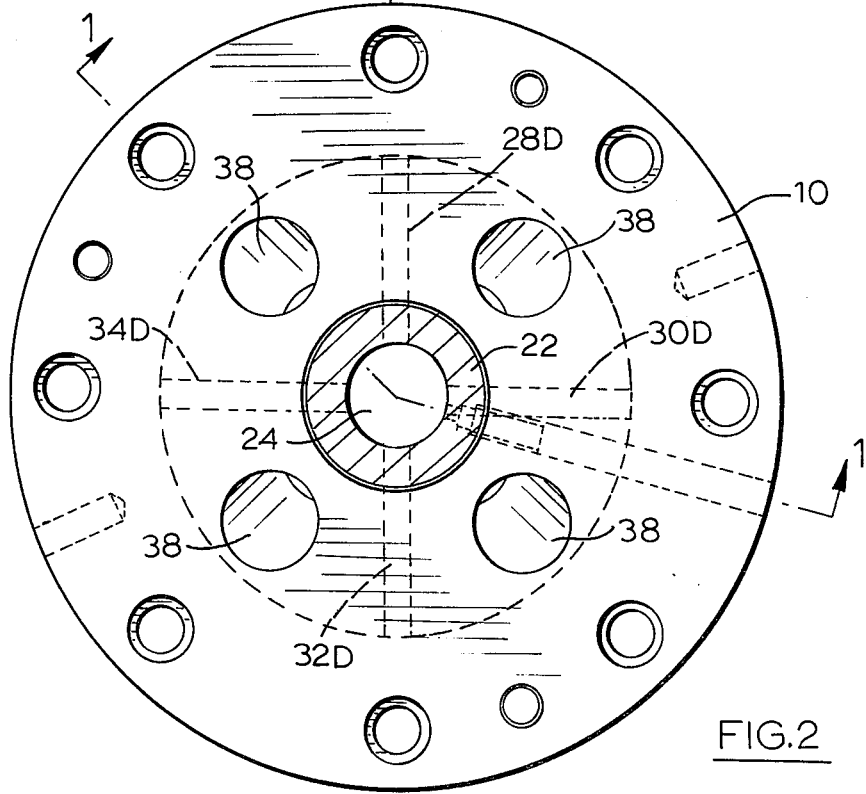
FIG. 2 is a plan view of the die of FIG. 1 from below.
Figure 3:
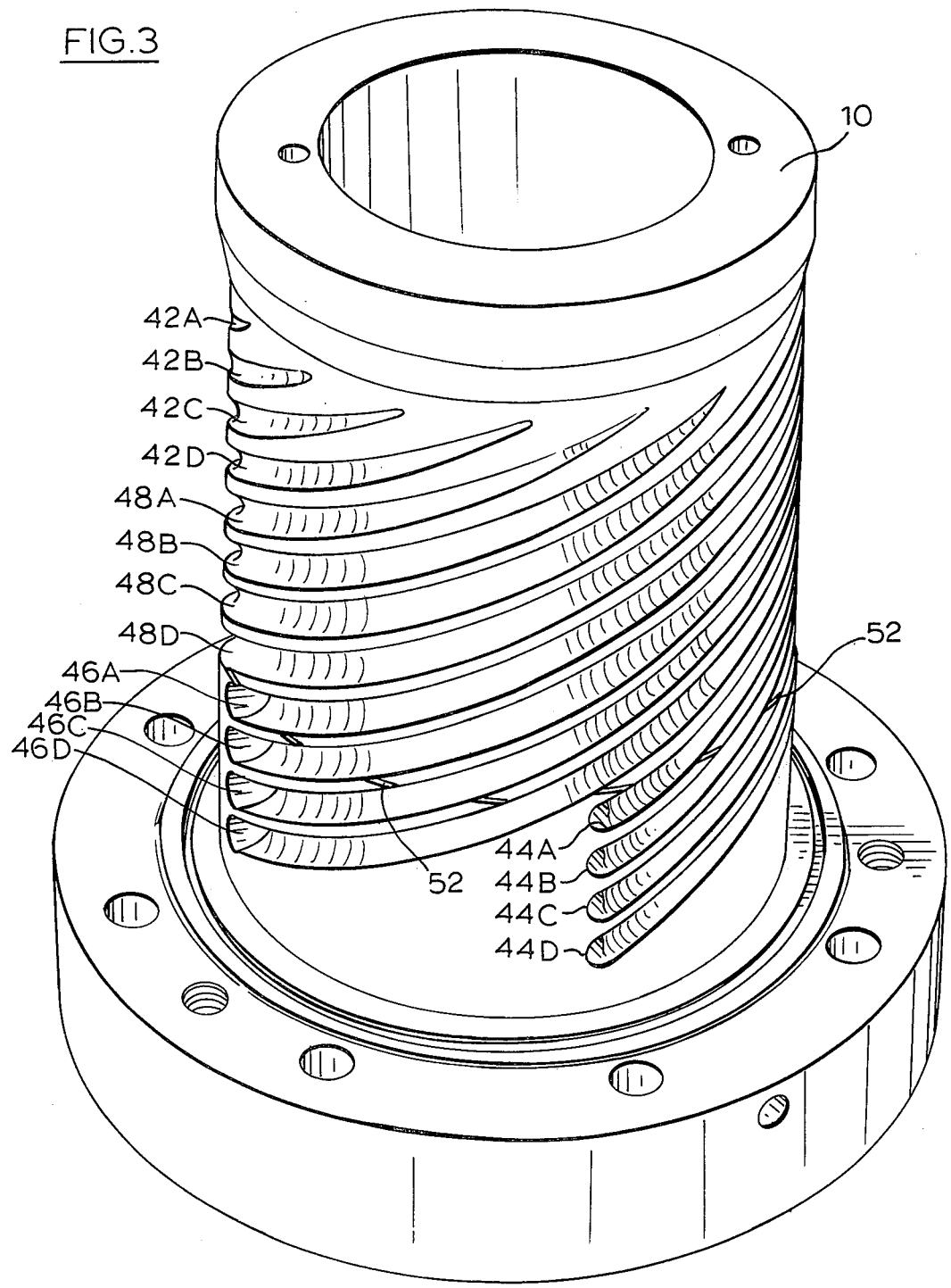
FIG. 3 is a perspective view of the mandrel alone to show the channels therein.

The mandrel also has formed therein four passages 38, which extend from a counterbore 40 in the centre of the mandrel to a lower face 41, these passages being used to convey the pipes of a bubble material cooling system from a cooling unit in the bubble interior to the remainder of the cooling system. Each immediately adjacent two passages 38 are disposed at 90° to one another, with each passage located between two sets of cross-holes and equally-angularly spaced from the two sets, as seen in FIG. 2.

The cross-holes are of uniform diameter along their lengths and the four holes of each set extend parallel to one another. Each cross-hole discharges at the mandrel cylindrical face into a respective helical groove or channel, formed in the mandrel cylindrical face, and extending in the direction of melt flow in the annular passage 16. The sets of grooves are given the respective references 42, 44, 46 and 48, while the grooves of each set have the reference subscript A, B, C and D. Each groove is of smoothly progressively decreasing cross-section along its length until they all terminate at the same cylindrical plane 50 perpendicular to the axis 36.

It is normal in prior art mandrels to relieve each groove almost immediately after its start, so that molten material can begin almost immediately to spill over its edge into the passage 16, but with a mandrel of the invention such relief is only provided, by the presence of the circular radially-extending relief step 52, after the commencement of all of the grooves. The passage 16 therefore only commences with respect to all of the grooves in the same plane, namely that of the step 52, downstream of all of the cross-hole outlets and the commencement of the respective grooves. The material in the longer earlier-starting grooves A therefore travels circumferentially a much greater distance than that in the later-starting grooves.

It is found unexpectedly that a mandrel construction of the invention gives the desired uniform tubular flow from the die orifice 18, despite the different lengths of the grooves or channels. As will be seen from FIG. 5, showing the groove arrangement of a prior art die, all of the channels are of the same length and of uniform characteristic, while with a die of the invention, as illustrated by FIG. 4, this cannot be the case and, as described above, the later-starting grooves are shorter in length than the earlier-starting grooves. I am at this time unable to explain why this unexpected beneficial effect is obtained. It may be that the part of the melt which reaches the later-starting grooves coming from closer to the centre of the flow in the passage 24 is somewhat hotter than that which reaches the earlier-starting grooves, and the extra shear applied to the cooler melt in the earlier-starting grooves compensates for this temperature difference, but I do not intend that the invention shall be limited by this hypothetical explanation.

This new disposition of the cross-holes and grooves or channels permits the provision of a large number of cross-holes (sixteen in the specifically-described embodiment), while giving the structural effect of a much smaller number (four only in this embodiment) leaving ample space for additional passages, such as the cooling passages 38. This may be contrasted with prior art structures in which the presence of twelve cross-holes causes extreme difficulty in finding space to provide any additional passages and/or producing severe limitations in the size of additional passages that can be provided. Each set will include at least two cross-holes to obtain the benefit of the invention, and sets of three and four are to be preferred, since the desired uniform flow is obtainable. In the embodiment illustrated the centres of the cross-hole inlet and outlet openings will be directly above one another in a plane containing the mandrel axis, and although this is most convenient for machining the mandrel, and provides the maximum usable space between the cross-hole sets, it is not an essential condition and some circumferential displacement from this "direct above" arrangement is possible.

This "stacking" of the cross-hole outlets and the channel starts, by permitting a larger number of such passages and channels, also results in a die having a lower pressure drop, which is always highly desirable in the plastic extrusion industry. The die is operable with a wider variety of conditions such as melt temperature, viscosity and flow rate, so that the same die can be used with a wide variety of melt materials, which again leads to desirable economies in manufacture and operation of the dies.

What is claimed:

1. An extrusion die of the spiral mandrel type comprising:
   a central mandrel having a cylindrical outer surface, disposed about a longitudinal axis;
   the mandrel having an inlet thereto and a plurality of outlets therefrom to the said outer surface, each outlet being connected to the inlet by a respective radially-extending cross-hole; and
   a cylindrical die body surrounding the mandrel whereby there is formed between them an annular flow passage into which the said outlets discharge and which terminates in an annular die outlet orifice;
   the said annular flow passage including a plurality of helical channels extending in the direction of flow of material in the annular passage, each helical channel being of progressively decreasing cross-sectional area in the said direction of flow, each outlet from the mandrel feeding into a respective helical channel and thence into the annular flow passage, so that all of the said outlets feed into the one said annular flow passage;
   wherein the said cross-holes and the respective outlets therefor feeding into the one said annular flow passage are disposed in a plurality of sets, each set consisting of at least two cross holes and two respective outlets, the two cross holes and respective outlets of each set being disposed one above the other axially with respect to the said longitudinal axis.

2. A die as claimed in claim 1, wherein the said cross-hole outlet openings lie directly above one another and are circular with their centres in a plane containing the mandrel longitudinal axis.

3. A die as claimed in claim 1, wherein the cross-hole inlet openings from the said mandrel inlet lie directly above one another and are circular with their centres in a plane containing the mandrel longitudinal axis.

4. A die as claimed in claim 1, wherein relief of all of the helical channels into the annular flow passage begins at the same plane perpendicular to the mandrel longitudinal axis downstream of the latest-starting mandrel outlets.

5. A die as claimed in claim 1, wherein each set includes three outlets, three respective cross holes and three respective helical channels.

6. A die as claimed in claim 1, wherein each set includes four outlets, four respective cross holes and four respective helical channels.

* * * * *